(12) United States Patent
Nakamura et al.

(10) Patent No.: US 6,181,850 B1
(45) Date of Patent: Jan. 30, 2001

(54) OPTICAL DEVICE

(75) Inventors: Noriyuki Nakamura; Yuzo Ochi; Satoshi Sugaya; Yasuko Kawasaki, all of Kanagawa-ken (JP)

(73) Assignee: Kabushiki Kaisha Shinkosha, Tokyo (JP)

( * ) Notice: Under 35 U.S.C. 154(b), the term of this patent shall be extended for 0 days.

(21) Appl. No.: 09/102,761

(22) Filed: Jun. 23, 1998

(30) Foreign Application Priority Data

Jul. 11, 1997 (JP) .................................................. 9-187063
Feb. 9, 1998 (JP) .................................................. 10-27362

(51) Int. Cl.$^7$ ...................................................... G02B 6/32
(52) U.S. Cl. ........................... 385/33; 385/34; 385/35; 385/37; 385/24; 359/124; 359/127; 359/131
(58) Field of Search .................................. 385/33, 34, 35, 385/37, 24, 14; 359/124, 127, 131

(56) References Cited

U.S. PATENT DOCUMENTS

| | | | |
|---|---|---|---|
| 5,165,104 | * 11/1992 | Weverka | 385/7 |
| 5,594,821 | * 1/1997 | Cheng | 385/24 |
| 5,657,155 | * 8/1997 | Cheng | 359/341 |
| 5,715,340 | * 2/1998 | Sasagawa | 385/33 |

FOREIGN PATENT DOCUMENTS 5-181035   7/1993   (JP) .
8-304855   11/1996  (JP) .

* cited by examiner

Primary Examiner—Cassandra Spyrou
Assistant Examiner—Leo Boutsikaris
(74) Attorney, Agent, or Firm—Kanesaka & Takeuchi

(57) ABSTRACT

An optical device incorporating an incident-side optical waveguide portion having an incident terminal port and an outgoing terminal port which are connected with a fiber array, and an outgoing-side optical waveguide portion having another outgoing terminal port. Between the incident-side and outgoing-side optical waveguide portions, there is disposed a wavelength division multiplexer for sending back an incident beam from the incident-side optical waveguide portion to the incident-side optical waveguide portion and permitting a part of the incident beam to pass therethrough. Between the wavelength division multiplexer and the outgoing-side optical waveguide portion, a polarization-independent type optical isolator is disposed. Between the wavelength division multiplexer and the incident-side optical waveguide portion, a first lens is disposed, and between the wavelength division multiplexer and the polarization-independent type optical isolator, a second lens is disposed.

6 Claims, 8 Drawing Sheets

OPTICAL DEVICE

BACKGROUND OF THE INVENTION

1. Field of the Invention

This invention relates to an optical device for use in an optical amplifier for optical communication and so on.

2. Description of the Prior Art

The applicant for patent on this invention proposed an optical device available to an optical fiber amplifier or the like (Japanese Patent Application Publication No. 8-304855 (A)).

The proposed optical device is provided with a prestage module and a poststage module which constitute the optical amplifier. The prestage module is assembled into a unit by incorporating collimators disposed on the incident side and the outgoing side of a signal beam, an unpolarizing beam splitter located between the collimators, a photodiode which receives a part of the signal beam from the incident-side collimator through the beam splitter, and a polarization-independent type optical isolator arranged between the beam splitter and the outgoing-side collimator. The outgoing-side collimator is connected to a rare-earth ion doped optical fiber.

The poststage module includes upper and lower collimators serving as incident-side optical terminals, and a collimator serving as an outgoing-side optical terminal. In the vicinity of the outgoing side of the upper incident-side collimator, a long-wave pass filter is disposed. A polarization-independent type optical isolator is disposed between the long-wave pass filter and the outgoing-side collimator in the poststage module, and a beam splitter is disposed between the optical isolator and the outgoing-side collimator.

To materialize miniaturization and elevation of the performance of the optical amplifier which is in increasing demand in recent years, there has been a need for various optical passive devices integrated effectively.

However, the conventional optical passive device, which generally incorporates lots of collimators and other component parts, has its limits in being diminished in size, and should be improved in structure to reduce its packaging area.

OBJECT OF THE INVENTION

An object of the present invention is to provide an optical device comprising a small number of component parts, which can be diminished in size and reduced in packaging area.

SUMMARY OF THE INVENTION

To attain the object described above according to this invention, there is provided an optical device comprising an incident-side optical waveguide portion, an outgoing-side optical waveguide portion, a reflecting member arranged between the optical waveguide portions so as to send back an incident beam from the incident side and permit a part of the incident beam to pass therethrough, a first lens disposed between the reflecting member and the incident-side optical waveguide portion, and a second lens disposed between the reflecting member and the outgoing-side optical waveguide portion. The incident-side optical waveguide portion includes one or more optical waveguides, and the outgoing-side optical waveguide portion includes one optical waveguide.

As the reflecting member, a wavelength division multiplexer, an optic branching device or the like may be used. When the optical waveguide has a plurality of terminal ports, the ports may be integrated with a fiber array in order to heighten the effect of diminishing the size of the device and reducing the packaging area of the device.

The optical device of this invention may incorporate a polarizationindependent type optical isolator as one optical component part. The optical isolator is placed between the reflecting member and the outgoing-side optical waveguide portion.

The optical device having the aforementioned optical isolator may further incorporate a plurality of reflecting members and three or more lenses. The reflecting members in this optical device may include at least first and second reflecting members. The optical device including first, second and third reflecting members has the following arrangement.

The first and second reflecting members are placed between the incident-side optical waveguide portion and the outgoing-side optical waveguide portion, and the optical isolator is placed between the first and second reflecting members. The first lens is placed between the incident-side optical waveguide portion and the first reflecting member. The second lens is placed between the first reflecting member and the optical isolator. The third lens is placed between the second reflecting member and the outgoing-side optical waveguide portion.

The optical device of the invention may comprise incident/outgoing-side optical waveguide portion including an incident-side optical waveguide and an outgoing-side optical waveguide, which are disposed on the same side of the device, a lens and a reflecting member. The lens is placed between the incident/outgoing-side optical waveguide portion and the reflecting member. The reflecting member permits the incident beam from the incident/outgoing-side optical waveguide portion to return to the incident/outgoing-side optical waveguide portion.

The optical device of the invention may comprise incident/outgoing-side optical waveguide portion, a lens, a reflecting member, and an optical semiconductor. The incident/outgoing-side optical waveguide portion includes an incident-side optical waveguide and an outgoing-side optical waveguide, which are disposed on the same side of the optical device. The lens is placed between the incident/outgoing-side optical waveguide portion and the reflecting member. The reflecting member permits the incident beam from the incident/outgoing-side optical waveguide portion to return to the incident/outgoing-side optical waveguide portion. The optical semiconductor is opposed to the lens astride the reflecting member.

The optical device of the invention may comprise incident/outgoing-side optical waveguide portion, first and second lenses, a reflecting member, and an optical semiconductor. The incident/outgoing-side optical waveguide portion includes an incident-side optical waveguide and an outgoing-side optical optical waveguide, which are disposed on the same side of the optical device. The first lens is placed between the incident/outgoing-side optical waveguide portion and the reflecting member. The second lens is opposed to the first lens astride the reflecting member. The optical semiconductor is opposed to the reflecting member astride the second lens. The reflecting member permits the incident beam from the incident/outgoing-side optical waveguide portion to return to the incident/outgoing-side optical waveguide portion.

The optical device of the invention may comprise incident/outgoing-side optical waveguide portion, a lens, a reflecting member, a functional member, and an optical semiconductor. The incident/outgoing-side optical waveguide portion includes an incident-side optical waveguide and an outgoing-side optical waveguide, which are disposed on the same side of the optical device. The lens is placed between the incident/outgoing-side optical waveguide portion and the reflecting member. The functional member is placed between the lens and the reflecting member. The optical semiconductor is opposed to the functional member astride the reflecting member. The reflecting member permits the incident beam from the incident/outgoing-side optical waveguide portion to return to the incident/outgoing-side optical waveguide portion.

In the optical device having the incident/outgoing-side optical waveguide portion in which the incident-side optical waveguide and outgoing-side optical waveguide are disposed on the same side of the device, the reflecting member having a function of selectively reflecting all the beam passing through the lens or the reflecting member capable of allowing the beam to partially pass therethrough may be selectively used according to the purposes for which the optical device is used. The optical semiconductor may include a photo detecting element which receives the beam passing through the reflecting member, and a light emitting element. When using these optical elements, there may be used an incident optical fiber as the incident-side optical waveguide and an outgoing optical fiber as the outgoing-side optical waveguide, so that terminals of these fibers are connected to each other with a fiber array.

Other objects and features of the present invention will be hereinafter explained in detail with reference to the accompanying drawings.

DESCRIPTION OF THE PREFERRED EMBODIMENTS

Figure 1:
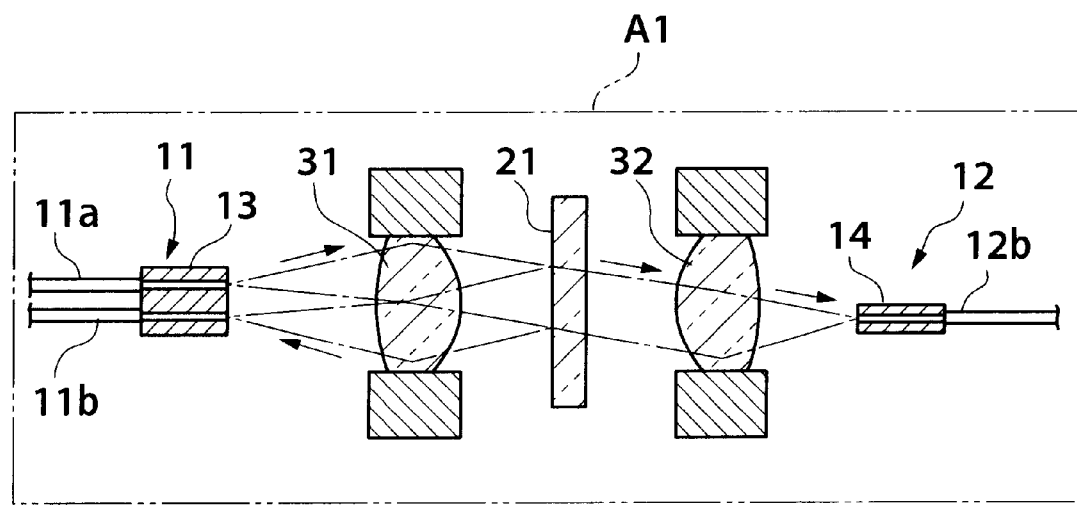
FIG. 1 is a schematic diagram showing one embodiment of the optical device having an incident-side optical waveguide portion and an outgoing-side optical waveguide portion according to this invention.
Figure 2:
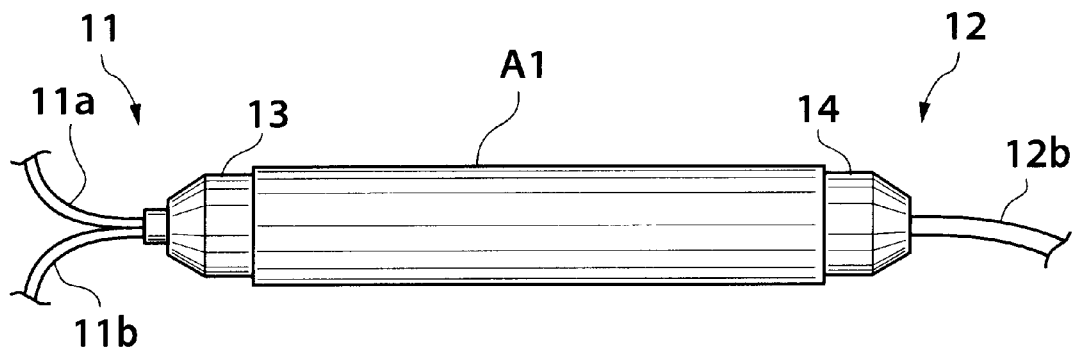
FIG. 2 is a front view showing the optical device of FIG. 1 in use.

Referring to FIG. 1 and FIG. 2, an optical device according to the present invention will be described.

The optical device A1 of the invention is provided on its one side (left side in the drawings) with an incident-side optical waveguide portion 11 including an optical waveguide 11a having an incident terminal port and another optical waveguide 11b having an outgoing terminal port, and on the other side with an outgoing-side optical waveguide portion 12 including at least one optical waveguide 12b having an outgoing terminal port.

The optical waveguide 11a and the optical waveguide 11b are integrated by connecting their incident and outgoing terminal ports through a fiber array 13. The outgoing terminal port of the optical waveguide 12b is assembled in a fiber terminal 14. The optical waveguides 11a, 11b and 12b are made of, for example, silica optical fiber, respectively.

Between the incident-side optical waveguide portion 11 and the outgoing-side optical waveguide portion 12, there is disposed a reflecting member 21 serving to send back a beam to the incident-side optical waveguide portion 11 and allow the beam to partially pass therethrough. Between the reflecting member 21 and the incident-side optical waveguide portion 11, a first lens 31 is positioned, and between the reflecting member and the outgoing-side optical waveguide portion 12, a second lens 32 is positioned.

As the reflecting member 21, for instance, a wavelength division multiplexer or an optic branching device may be used.

Where the wavelength division multiplexer is used as the reflecting member 21, a signal beam propagated from the incident terminal port of the optical waveguide 11a to the first lens 31 is divided by the reflecting member 21 according to its wavelength, and then, sent to the outgoing terminal port of the optical waveguide 11b and the outgoing terminal port of the optical waveguide 12b. In this case, one of the light components divided out from the signal beam by the reflecting member 21, which is, for example, 1550 nm in wavelength, passes through the reflecting member 21 and advances to the outgoing terminal port of the optical waveguide 12b through the second lens 32 as it is. On the other hand, the remaining light component divided out from the signal beam, which is, for example, 980 nm in wavelength, is reflected and sent back to the incident-side optical waveguide portion 11, and then, forwarded to the incident terminal port of the optical waveguide 11b after being concentrated by the first lens 31.

Incidentally, it is desirable to determine the wavelengths of the light components divided out from the signal beam to not only 980 nm and 1550 nm as described above, but also 1020 nm and 1310 nm, 1310 nm and 1550 nm, or 1480 nm and 1550 nm, as examples.

Where the optic branching device is used as the reflecting member 21, the beam propagated from the incident terminal port of the optical waveguide 11a into the first lens 31 is distributed by the reflecting member 21 to be sent to the outgoing terminal port of the optical waveguide 11b and the outgoing port of the optical waveguide 12b. In this case, for example, 99% of the light beam distributed from the signal beam by the reflecting member 21 passes through the reflecting member 21 and advances to the outgoing terminal port of the optical waveguide 12b through the second lens 32 as it is. On the other hand, the remaining 1% light component is reflected and sent back to the incident-side optical waveguide portion 11, and then, forwarded to the incident terminal port of the optical waveguide 11b after being concentrated by the first lens 31.

The proportion of the light components distributed from the signal beam may be determined to not only 99:1 as described above, but also 50:50 or 95:5 according to the purposes for which the optical device of the invention is used.

In the optical device shown in FIG. 1, the incident-side optical waveguide portion may be positioned on the right side of the drawing, and the outgoing-side optical waveguide portion may be positioned on the left side of the same, as a countermeasure. That is, the optical waveguide portion 12 may be used as the incident-side optical waveguide portion, and the optical waveguide portion 11 opposite to the portion 12 may be used as the outgoing-side optical waveguide portion.

Another embodiment of the optical device of the invention will be described with reference to FIG. 3 and FIG. 4.

The optical device A2 in this embodiment has the same structure as the embodiment of FIG. 1 except an optical isolator. Therefore, the identical or similar components of this embodiment are denoted by the like numerical symbols in an easily understandable manner.

The optical device in this embodiment employs the optical isolator 41 of a polarization-independent type, which is disposed between the reflecting member 21 and the terminal 14 of the outgoing-side optical waveguide portion 12.

Also in this embodiment, in the case where a wavelength division multiplexer or an optic branching device is used as the reflecting member 21, the signal beam propagated from the incident terminal port of the optical waveguide 11a to the first lens 31 is divided or distributed by the reflecting member 21 according to its wavelength, and then, sent to the outgoing terminal port of the optical waveguide 11b and the outgoing terminal port of the optical waveguide 12b.

Figure 3:
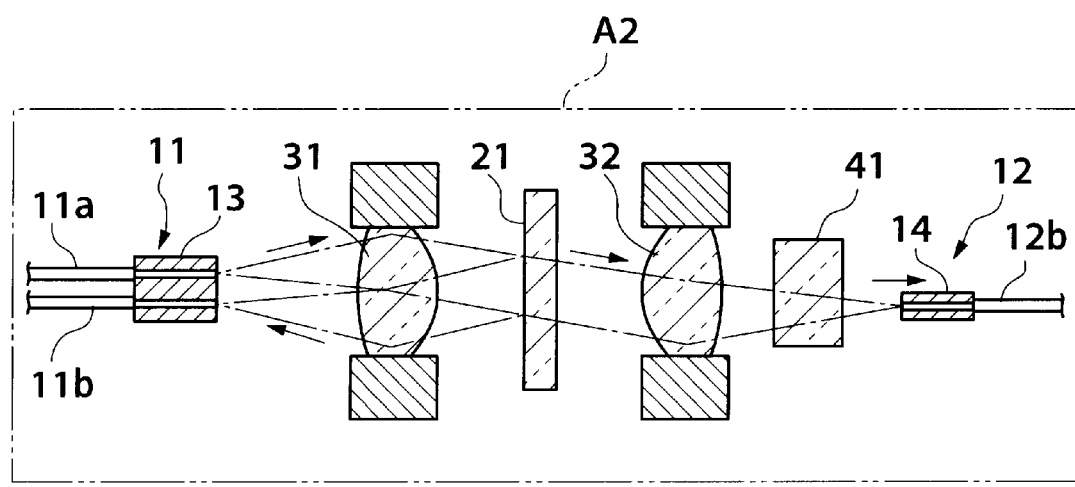
FIG. 3 is a schematic diagram showing another embodiment of the optical device having an incident-side optical waveguide portion and an outgoing-side optical waveguide portion according to this invention.
Figure 4:
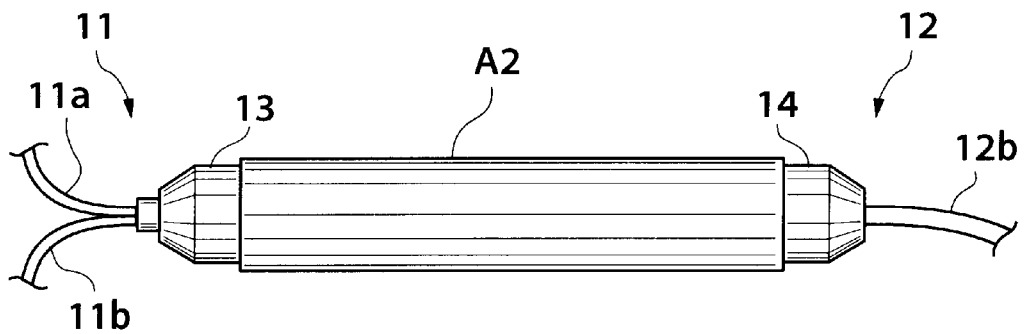
FIG. 4 is a front view showing the optical device of FIG. 3 in use.

In this embodiment of FIG. 3, the incident-side optical waveguide portion may be positioned on the right side of the drawing, and the outgoing-side optical waveguide portion may be positioned on the left side of the same, as a countermeasure. That is, the optical waveguide portion 12 may be used as the incident-side optical waveguide portion, and the optical waveguide portion 11 opposite to the portion 12 may be used as the outgoing-side optical waveguide portion. In this case, since the propagating direction of the beam in the modified structure is reverse to that in the original, the arrangement of the components of the optical isolator in the modified structure should be reversed to the original.

Figure 5:
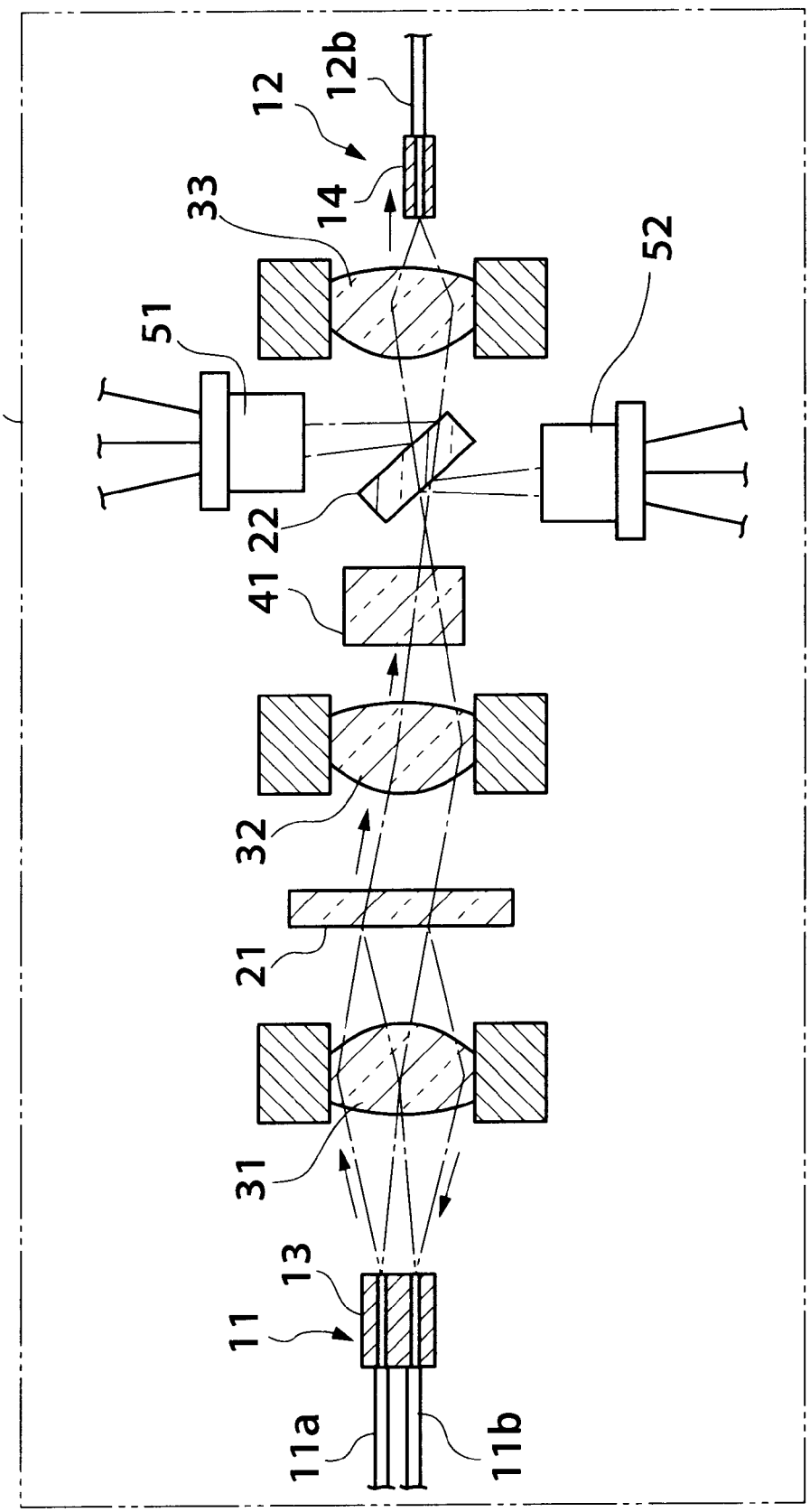
FIG. 5 is a schematic diagram showing still another embodiment of the optical device having an incident-side optical waveguide portion and an outgoing-side optical waveguide portion according to this invention.
Figure 6:
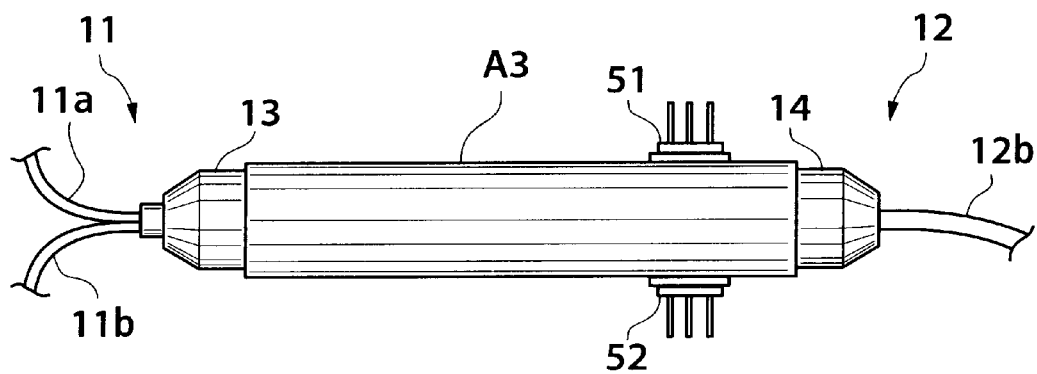
FIG. 6 is a front view showing the optical device of FIG. 5 in use.

Still another embodiment of the optical device of the invention will be described with reference to FIG. 5 and FIG. 6.

The optical device A3 in this embodiment has the same structure as the embodiment of FIG. 3 except that the device further includes a plurality of reflecting members and three or more lenses. Therefore, the identical or similar components of this embodiment are denoted by the like numerical symbols.

As illustrated, in addition to the first reflecting member 21, a second reflecting member 22 is disposed between the optical isolator 41 and the outgoing-side optical waveguide portion 12, and a third reflecting lens 33 is disposed between the second reflecting member 22 and the outgoing-side optical waveguide portion 12. Moreover, photodiodes 51 and 52 as optical semiconductors are opposite to each other astride the second reflecting member 22.

Figure 7:
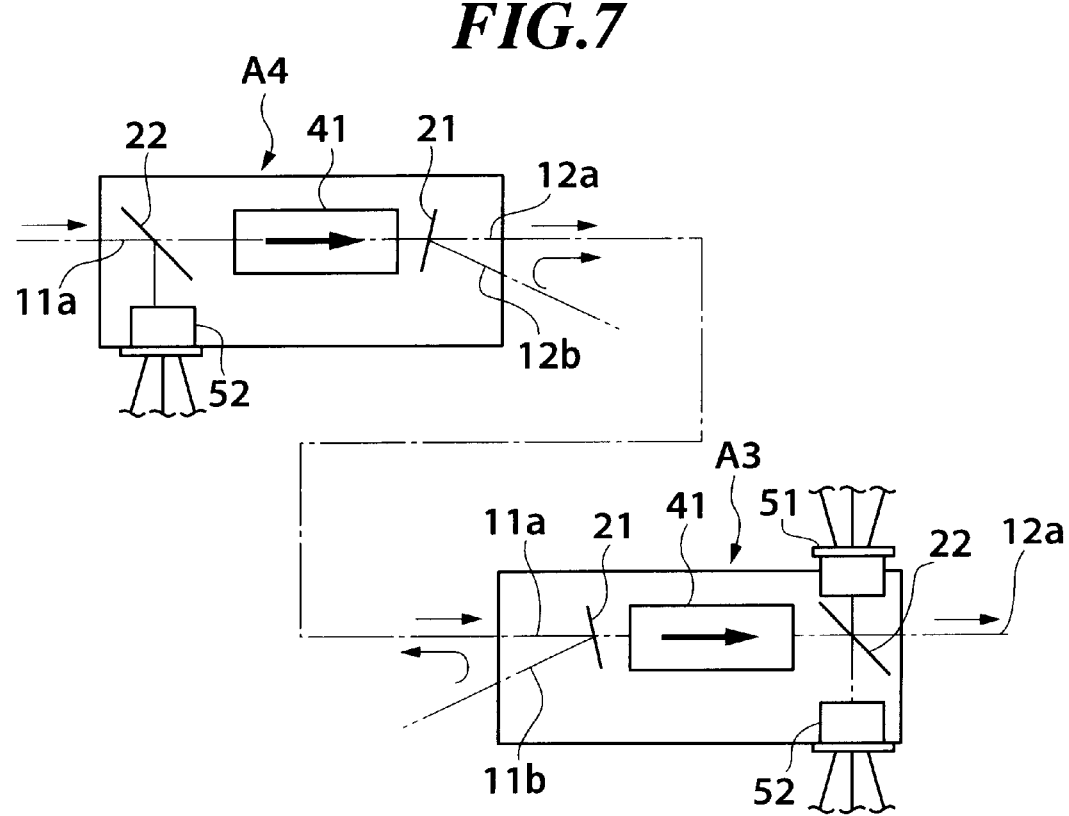
FIG. 7 is a schematic diagram of yet another embodiment of the optical device of the invention, which is used as an optical amplifier.

FIG. 7 shows an optical amplifier according to the invention. The optical amplifier is constituted by an optical device A4 as a prestage module, which is modified from the aforementioned optical device A3, and the optical device A3 shown in FIG. 5 as a poststage module.

The order in which the component elements constituting the optical device A4 are arranged is reverse to the order of the component elements 11(11a,11b), 31, 21, 32, 41, 22, 33 and 12(12b) constituting the optical device A3. That is, in the optical device A4, between the incident terminal port of the single optical waveguide 11a and the outgoing terminal ports of the optical waveguides 12a and 12b, the reflecting member 22 formed of the optic branching device, the optical isolator 41, and the reflecting member 21 formed of the wavelength division multiplexer are arranged in order. Since the direction of the beam passing through the optical isolator 41 is reverse to that of the beam passing through the optical isolator in the optical device A3, the component elements are arranged in the reverse order. In FIG. 7, lenses are not shown.

The optical device A4 does not include the photodiode 51 used in the optical device A3.

The operation of the optical devices in this embodiment will be described. A signal beam, which passes through the reflecting member 21 and emanates from the outgoing terminal port of the optical waveguide 12a in the optical device A4 serving as a prestage module, is merged with an exciting beam emanating from the outgoing terminal port of the optical waveguide 12b, and then, advances to the incident terminal port of the optical waveguide 11a through a rare-earth ion doped silica optical fiber contributing to amplification in the optical device A3 serving as a poststage module. The resultant signal beam passes through the reflecting member 21 composed of the wavelength division multiplexer. The resultant signal beam further advances to the outgoing terminal port of the optical waveguide 12a through the reflecting member 22 composed of the optic branching device. The exciting beam from the incident terminal port of the optical waveguide 11b advances to the rare-earth ion doped silica optical fiber contributing to amplification.

The optical devices A1 to A4 each can be more diminished in size and packaging area by integrating the incident terminal port with the outgoing terminal port of the optical waveguides 11a and 11b by use of a fiber array to decrease the number of the component parts.

Although the incident-side optical waveguide and the outgoing-side optical waveguide are opposed to each other member astride the reflecting member in the optical devices A1 to A4 shown in FIG. 1 through FIG. 7, the incident-side optical waveguide and the outgoing-side optical waveguide may be disposed on the same side as shown in FIG. 8 through FIG. 15.

An optical device A11 having the incident-side and outgoing-side optical waveguides disposed on the same side will be described below with reference to FIG. 8 and FIG. 9.

The optical device A11 is provided with an incident/outgoing-side optical waveguide portion 1111, a lens 1131, a reflecting member 1121, and a functional member 1161.

Figure 8:
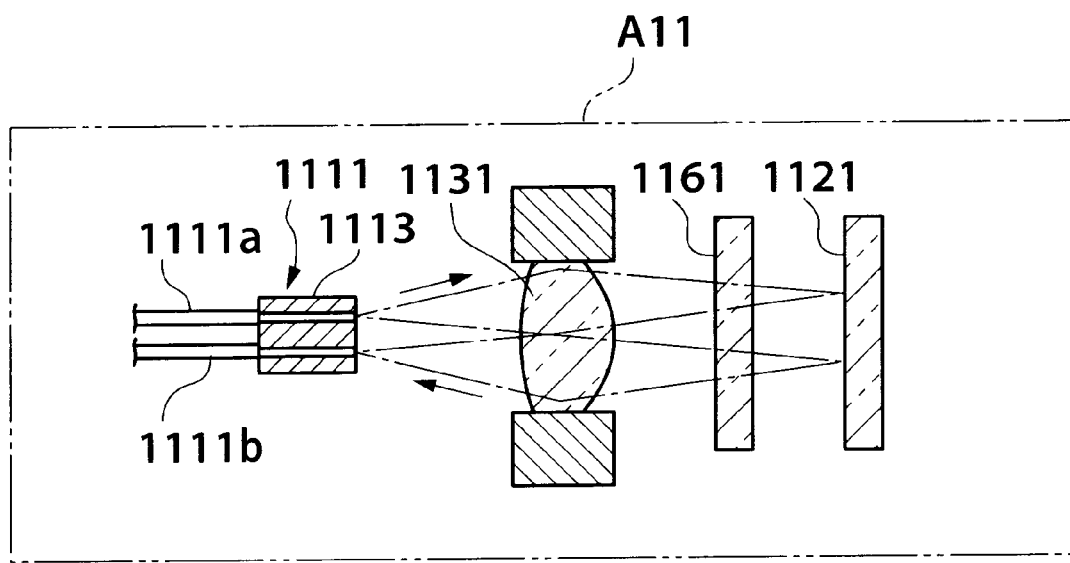
FIG. 8 is a schematic diagram showing a further embodiment of the optical device having an incident/outgoing-side optical waveguide portion according to this invention.
Figure 9:
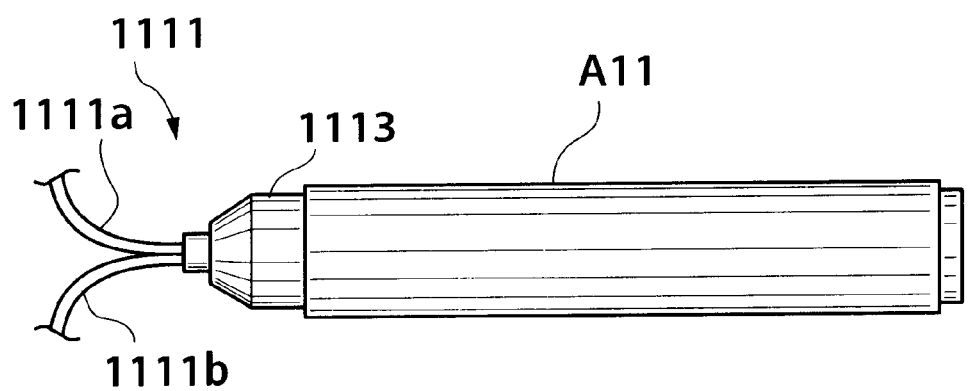
FIG. 9 is a front view showing the optical device of FIG. 8 in use.

The incident/outgoing-side optical waveguide portion 1111 includes an optical waveguide 1111a (upper waveguide) placed on the left side of FIG. 8 is an incident-side optical waveguide having an incident terminal port, and an optical waveguide 1111b (lower waveguide) is an outgoing-side optical waveguide having an outgoing terminal port. The incident terminal port of the optical waveguide 1111a and the outgoing terminal port of the optical waveguide 1111b are integrated with a fiber array 1113 which is a stationary element in the device. The optical waveguides 1111a and 1111b each are formed of an optical fiber such as, for example, a silica optical fiber.

The optical device A11 has the lens 1131 opposed to the fiber array 1113, the reflecting member 1121 located on the opposite side to the fiber array across the lens, and the functional member 1161 disposed between the lens and the reflecting member.

The reflecting member 1121 serves to send back all the beam to the side of the fiber array 1113. As the reflecting member 1121, a total reflection mirror or the like may be used.

The functional member 1161 allows a part of the beam to pass therethrough. As the functional member 1161, a band-pass filter (wavelength-selective filter) must be used for permitting a light component in a specific wavelength band to pass therethrough and reflecting the other light component.

According to the optical device as described, a signal beam from the incident terminal port of the incident-side optical waveguide 1111a advances in the direction indicated by the arrow in FIG. 8, passes through the lens 1131 and is incident on the functional member 1161. As a result, the beam having a specific wavelength is permitted to pass through the functional member and the remaining beam is reflected and sent to the outgoing-side optical waveguide 1111b. The beam having the specific wavelength which is permitted to pass through the functional member is reflected by the reflecting member 1121 and sent back to the functional member 1161. The beam passing again through the functional member is concentrated by the lens 1131 and sent out through the outgoing terminal port of the outgoing-side optical waveguide 1111b.

The optical device A11 can be used as, for example, a band-pass filter module for an optical amplifier on a receiving end. As one example, in the case that a total reflection mirror is used as the reflecting member 1121 and a band-pass filter capable of permitting only a beam component having a wavelength of 1557 nm is used as the functional member 1161 in the band-pass filter module A11 of this sort, when beam components of 1533 nm, 1541 nm, 1549 nm and 1557 nm are given through the incident-side optical waveguide, only the beam component of 1557 nm is permitted to pass through the band-pass filter 1161 and sent out from the outgoing-side optical waveguide 1111b.

Figure 10:
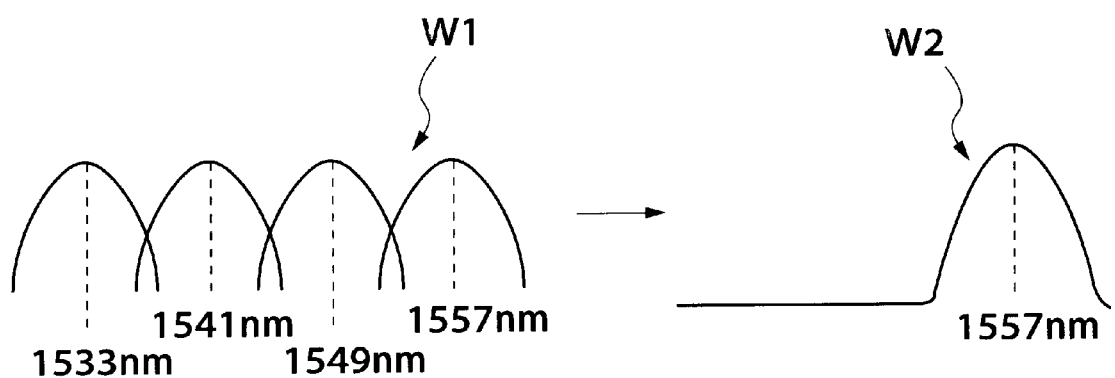
FIG. 10 is a diagram showing the waveform of an incident signal beam passing through a functional member in the optical device of the invention.
Figure 11:
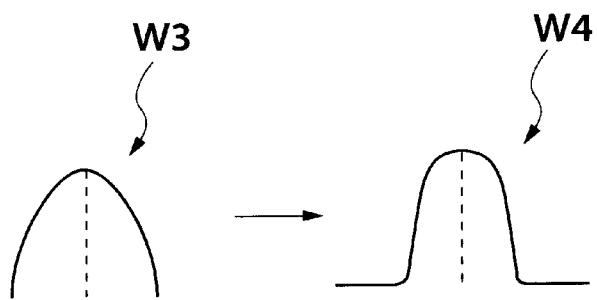
FIG. 11 is a diagram showing the waveform of the signal beam passed through the functional member, when the beam again passes through the functional member in the optical device of the invention.

Observing waveforms of the beams advancing from the incident side to the outgoing side of the optical device, transition in waveform is found as shown in FIG. 10 and FIG. 11.

That is, the aforementioned four beams before entering the band-pass filter 1161 show the waveforms W1 illustrated on the left side in FIG. 10, and the passing beam of 1557 nm in wavelength through the band-pass filter shows the waveform W2 on the right side.

The passing beam of 1557 nm, which passed through the band-pass filter 1161 and reflected by the total reflection mirror 1121, but does not yet reenter the band-pass filter 1161, shows the waveform W3 illustrated on the left side in FIG. 11. The waveform W4 shows the state of the beam after passing through the band-pass filter 1161.

As is understood from the waveforms illustrated, the optical device of this embodiment has an optical characteristic such that, when the beam having a specific wavelength passes through the band-pass filter twice, the waveform of the beam changes in waveform to a waveform closer to a rectangular waveform (square waveform).

Next, an optical device A12 will be described with reference to FIG. 12.

Figure 12:
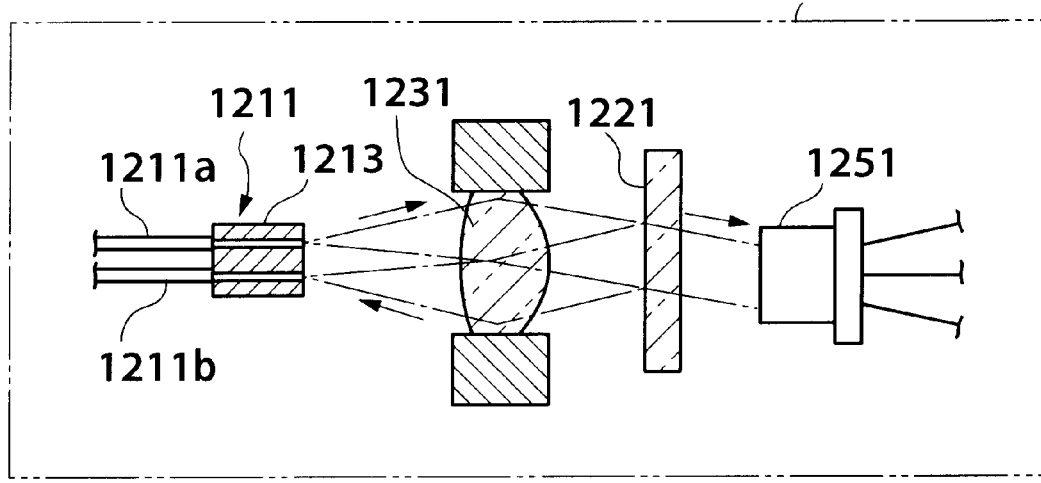
FIG. 12 is a schematic diagram showing a more specific embodiment of the optical device having an incident/outgoing-side optical optical waveguide portion according to this invention.

The optical device A12 is provided with an incident/outgoing-side optical waveguide portion 1211, a lens 1231, and a reflecting member 1221, which are disposed on the left half of FIG. 12, in common with the optical device A11 described above. The optical device A12 differs from the optical device A11 in that an optical semiconductor 1251 is used instead of the aforementioned functional member 1161.

The optical semiconductor 1251 is a photo detecting element which is opposite to the lens 1231 across the reflecting member 1221 so as to receive the beam passing through the reflecting member 1221.

As the reflecting member 1221, an unpolarizing beam splitter and so on is may be used. In the case of using the unpolarizing beam splitter as the reflecting member 1221, the distribution ratio of the splitter may be arbitrarily determined to, for example, 95:5, 99:1 or 90:10.

As the optical semiconductor 1251, a photodiode or the like may be used.

In the incident/outgoing-side optical waveguide portion 1211, an element 1211a is an incident optical waveguide, and an element 1211b is an outgoing optical waveguide.

The optical device A12 may be used as an optical amplifier in which signal beams of an input signal and an output signal are monitored by means of the photodiode 1251 so as to fulfill automatic power-off control for the optical amplifier.

To be more specific, in the case of using the unpolarizing beam splitter of 95:5 in distribution ratio as the reflecting member 1221 and the photodiode as the optical semiconductor 1251 in the optical device shown in FIG. 12, when a signal beam of, for example, 1.55 μm in wavelength is sent from the incident-side optical waveguide 1211a, the photodiode 1251 receives 5% of the signal beam passing through the unpolarizing beam splitter 1221, but 95% of the signal beam is reflected by the unpolarizing beam splitter 1221 and sent out from the outgoing-side optical waveguide 1211b through the lens 1231.

Figure 13:
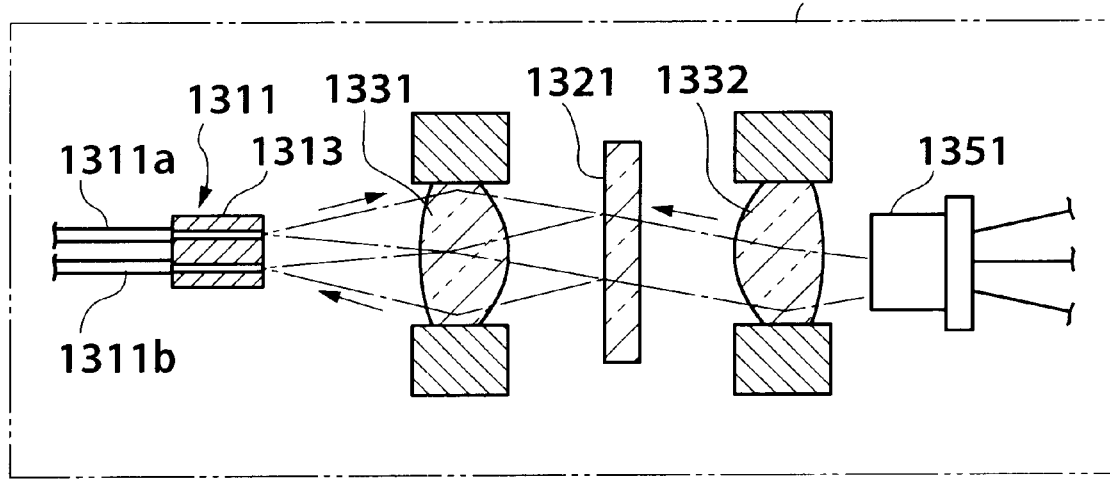
FIG. 13 is a schematic diagram showing the other embodiment of the optical device having an incident/outgoing-side optical waveguide portion according to this invention.

With reference to FIG. 13, an optical device A13 will be described hereinafter.

The optical device A13 is provided with an incident/outgoing-side optical waveguide portion 1311, a lens 1331, and a reflecting member 1321, which are disposed on the left half of FIG. 13. Thus, this optical device A13 is the same as the optical device A12 described above except for a lens 1332. That is, the optical device A13 includes the first lens 1331 and the second lens 1332. In is particular, the second lens 1332 functions to enhance the efficiency of coupling the signal beam passing through the reflecting member 1321 to the optical semiconductor 1351.

Thus, the optical device A13 is substantially identical in structure with the optical device A12 except for the difference in structure described above.

In FIG. 13 showing the incident/outgoing-side optical waveguide portion 1311, reference numeral 1311a denotes an incident optical waveguide, 1311b denotes an outgoing optical waveguide, and 1313 denotes a fiber array.

In the optical device A13 using the unpolarizing beam splitter of, for example, 95:5 in distribution ratio as the reflecting member 1321, after the signal beam which is given from the incident-side optical waveguide 1311a and passes through the first lens 1331, 5% of the signal beam is reflected by the unpolarizing beam splitter, passes through the first lens 1331, and then, is sent out from the outgoing-side optical waveguide 1311b, and on the other hand, the remaining 95% beam is concentrated by the second lens 1332 and arrives at the optical semiconductor, i.e. photodiode 1351.

Figure 14:
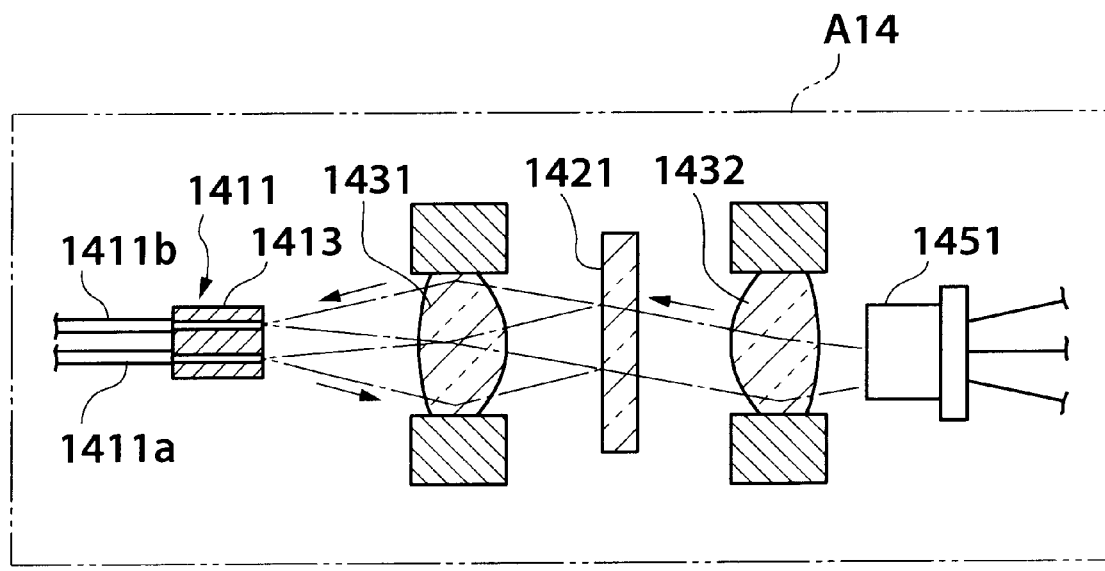
FIG. 14 is a schematic diagram showing an alternate embodiment of the optical device having an incident/outgoing-side optical waveguide portion according to this invention.

With reference to FIG. 14, an optical device A14 will be described hereinafter.

The optical device A14 comprises an incident/outgoing-side optical waveguide portion 1411, first and second lenses 1431 and 1432, a reflecting member 1421, and an optical semiconductor 1451. The optical device A14 is substantially identical in arrangement of components with the optical device A13, except the following structure.

First, in the incident/outgoing-side optical waveguide portion 1411 of the optical device A14, an outgoing-side optical waveguide 1141b having an outgoing terminal port is positioned above an incident-side optical waveguide 1141a having an incident terminal port, as shown on the left side of FIG. 14.

Second, the optical semiconductor 1451 is a light emitting element.

Thus, a signal beam from the incident-side optical waveguide 1411a is reflected by the reflecting member 1421 after passing through the lens 1431, and then, sent out from the outgoing-side optical waveguide 1411b. An exciting beam emanating from the optical semiconductor 1451 is delivered to the outgoing-side optical waveguide 1411b upon being merged with the passing beam through the reflecting member 1421.

As the reflecting member 1421, there may be used a WDM filter (wavelength division multiplexing membrane), e.g. a long-wave reflecting membrane. To be more concrete, combinatorial filtrating wavelength of the WDM filter may be arbitrarily determined to, for example, 1.48/1.55 μm, 1.02/1.31 μm, or 1.31/1.55 μm in accordance with the usage.

As the optical semiconductor 1451, a laser diode or the like may be used.

The optical device A14 can be applied to an optical amplifier which has been practically used in the latest optical amplification technique. The optical amplifier may employ a 1.48/1.55-type WDM optical coupler for merging, for instance, an exciting beam of 1.48 μm in wavelength band with a signal beam of 1.55 μm in wavelength band.

In the embodiment shown in FIG. 14, the reflecting member 1421 of a 1.48/1.55-type WDM filter (wavelength division multiplexing membrane) and the optical semiconductor 1451 of a laser diode serving as a source for emitting an exciting beam are combined into a module. A signal beam of 1.55 μm in wavelength from the incident-side optical waveguide 1411a is reflected by the WDM filter 33A and advances to the outgoing-side optical waveguide 1411b. The exciting beam of 1.48 μm in wavelength passes through the second lens 1432 and the WDM filter, and then, is sent to the outgoing-side optical waveguide 1411b upon being merged with the signal beam.

Figure 15:
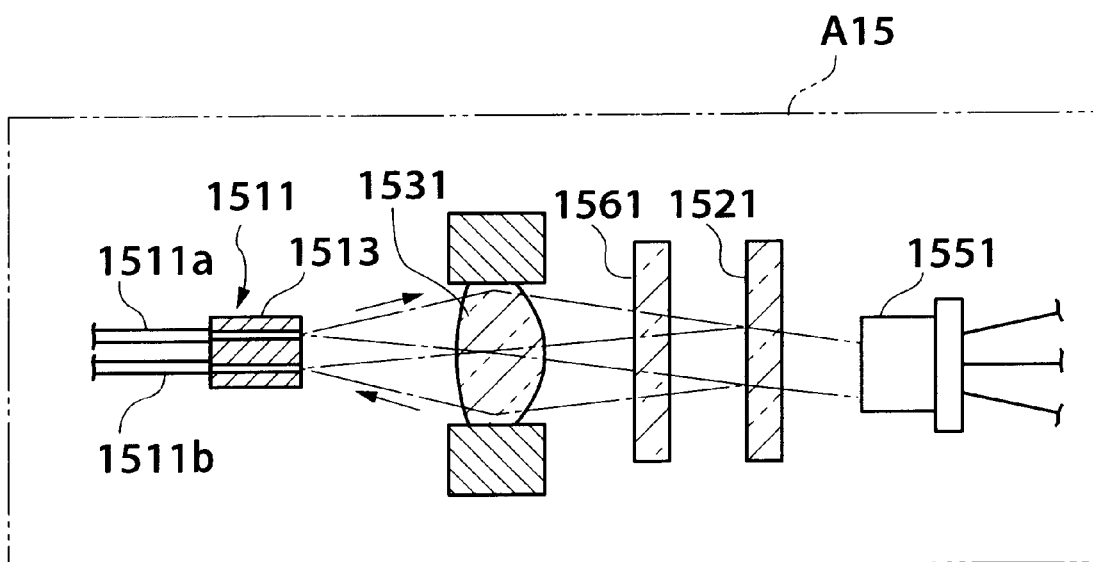
FIG. 15 is a schematic diagram showing a further modified embodiment of the optical device having an incident/outgoing-side optical waveguide portion according to this invention.

With reference to FIG. 15, an optical device A15 will be described hereinafter.

The optical device A15 is provided with an incident/outgoing-side optical waveguide portion 1511, a lens 1531, a reflecting member 1521, and a functional member 1561. This optical device A15 is the same as the optical device A11 described above except for an optical semiconductor 1551.

As the reflecting member 1521, an optic branching device (e.g. 99:1, 95:1, or 90:1 in distribution ratio) and so on may be used. As functional member 1561, a band-pass filter (wavelength-selective filter) and so on may be used. As the optical semiconductor 1551, a photodiode or the like may be used.

The optical device A15 can be applied to an optical amplifier on a receiving end for wavelength multiplex communication (WDM communication) and so forth. That is, this optical device is formed in a module having a function of letting the optical semiconductor 1551 such as a photodiode receive a desired signal beam and another function of monitoring the signal beam. In the case where a band-pass filter capable of permitting a beam having, for example, 1557 nm in wavelength to pass therethrough is used as the functional member 1561 and the optic branching device capable of permitting 5% of the beam to pass therethrough is used as the reflecting member 1521, the following operation is effected.

When the aforementioned four beams having different wavelengths are given from the incident-side optical waveguide 1511a, only the beam of 1557 nm in wavelength is permitted to pass through the band-pass filter (functional member 1561), and 5% of the passing beam through the band-pass filter further advances through the optic branching device (reflecting member 1521) and reaches the photodiode (optical semiconductor 1551). By the optic branching device 1521, 95% of the passing beam through the band-pass filter 1561 is reflected, and then again passes through the band-pass filter, consequently to reform the resultant beam to a waveform closer to rectangular waveform (ideal waveform). Thus, the beam having desirable waveform is outputted from the outgoing-side optical waveguide 1511b.

In the optical devices A11, A12, A13, A14 and A15, the number of component elements constituting, for example, a collimator can be minimized by connecting the incident terminal ports of the incident-side optical waveguides 1111a, 1211a, 1311a, 1411a and 1511a and the outgoing terminal ports of the outgoing-side optical waveguides 1111b, 1211b, 1311b, 1411b and 1511b with the fiber arrays 1113, 1213, 1313, 1413 and 1513, respectively. Furthermore, the optical device of the invention can be diminished in size by placing the incident-side optical waveguide portion and the outgoing-side optical waveguide portion on the same side of the device and providing the reflecting members 1121, 1221, 1321, 1421 and 1521 so as to cause the signal beam incident on one side of the device to be sent back to the same side as the incident side of the device without permitting the incident signal beam to advance to the other side opposite to the incident side. As a result, the packaging area necessary for mounting the optical device of the invention can be reduced. The optical device of the invention can be more diminished in size and reduced in its packaging area by uniting the incident terminal port of the incident-side optical waveguide and the outgoing terminal port of the outgoing-side optical waveguide with a fiber array.

It is to be understood that the invention is not limited in its application to the details of construction and arrangement of parts illustrated in the accompanying drawings, since the invention is capable of other embodiments and of being practiced or carried out in various ways. Also it is to be understood that the phraselogy or terminology employed herein is for the purpose of description and not for limitation.

What is claimed is:

1. An optical device comprising:

an incident side optical waveguide portion, an outgoing side optical waveguide portion situated near the incident side optical waveguide portion, a first optical reflecting member situated between the incident side optical waveguide portion and the outgoing side optical waveguide portion, said first optical reflecting member returning a part of an incident beam passing through the incident side optical waveguide portion to the incident side optical waveguide portion and allowing a part of the incident beam to pass therethrough, said first optical reflecting member being a wavelength division multiplexer, an optical isolator with polarization independent characteristic situated between the first optical reflecting member and the outgoing side optical waveguide portion, a first lens situated between the first reflecting member and the incident side optical waveguide portion, a second lens situated between the first optical reflecting member and the optical isolator, a second optical reflecting member situated at a side opposite to the first reflecting member relative to the optical isolator and forming an optical branching device, and a third lens situated between the second reflecting member and the outgoing side optical waveguide portion.

2. An optical device according to claim 1, wherein said incident side optical waveguide portion includes two optical waveguides, and said outgoing side optical waveguide portion includes one optical waveguide.

3. An optical device according to claim 2, wherein one of the optical waveguides in the incident side optical waveguide portion includes an incident port, and the other of the optical waveguides in the incident side optical waveguide portion includes an outgoing port, said optical waveguide in the outgoing side optical waveguide portion including an outgoing port, said two optical waveguides in the incident side optical waveguide portion being connected by a fiber array.

4. An optical device according to claim 1, further comprising a photo semiconductor for receiving a beam reflected by the second optical reflecting member situated at one side of the second optical reflecting member.

5. An optical device according to claim 4, wherein said photo semiconductor is a photodiode.

6. An optical device according to claim 4, further comprising photo semiconductors for receiving beams reflected by the second optical reflecting member, said photo semiconductors being arranged to sandwich the second optical reflecting member.

* * * * *